Sept. 30, 1952　　　　K. H. SCHÜTZ　　　　2,612,093
OPTICAL SYSTEM WITH SEMIAUTOMATIC DIAPHRAGM
ADJUSTMENT TO PRESELECTED POSITION
Filed May 31, 1950

INVENTOR.
Karl H. Shütz
BY
Karl F. Ross
AGENT

Patented Sept. 30, 1952

2,612,093

UNITED STATES PATENT OFFICE 2,612,093

OPTICAL SYSTEM WITH SEMIAUTOMATIC DIAPHRAGM ADJUSTMENT TO PRESELECTED POSITION

Karl Heinz Schütz, Bad Kreuznach, Germany, assignor to Jos. Schneider & Co., Kreuznach, Germany Application May 31, 1950, Serial No. 165,193
In Germany November 16, 1949

3 Claims. (Cl. 95—64)

The present invention relates to an optical system for cameras, particularly but not exclusively for reflex cameras in which the image objective also serves as the finder objective, and has for its primary object the provision, in a camera, of means for semi-automatically returning the diaphragm thereof to a preselected position after it has been displaced therefrom by the operator.

In a reflex camera of the above-described class it is usually necessary to use different diaphragm openings for the finding process and for the actual "shot," or taking of the picture; thus it will be desirable to adjust the diaphragm opening to its maximum when the objective is employed for centering purposes, in order to obtain a bright reflected picture, while in many cases over-exposure would result unless the opening were returned to its predetermined size before releasing the shutter. It is an inherent disadvantage of these cameras that the user is apt to forget this re-adjustment of the diaphragm and, thereby, to spoil the picture sought to be taken.

It is, accordingly, another object of this invention to provide means for coupling the return of the diaphragm to its preselected position with the operation of some camera element which the user must actuate on or just before taking the shot, such as, for example, the cable release which operates the shutter, thereby insuring the timely readjustment of the diaphragm opening.

A further object of the invention, allied with the preceding one, is to provide means adapted to effect a virtually instantaneous return of the diaphragm from full opening to preselected position.

With these objects in view the invention provides, essentially, first indexing means for arresting the diaphragm in any one of a plurality of preselectable positions, second indexing means for locking the diaphragm in its position of maximum opening, a trip member (perferably controlled by the shutter release of the camera) operable in the position of maximum opening of the diaphragm to disable the second indexing means and render the first indexing means effective, and resilient means returning the diaphragm to its preselected position under control of the first indexing means following the operation of the trip member.

Figure 1:
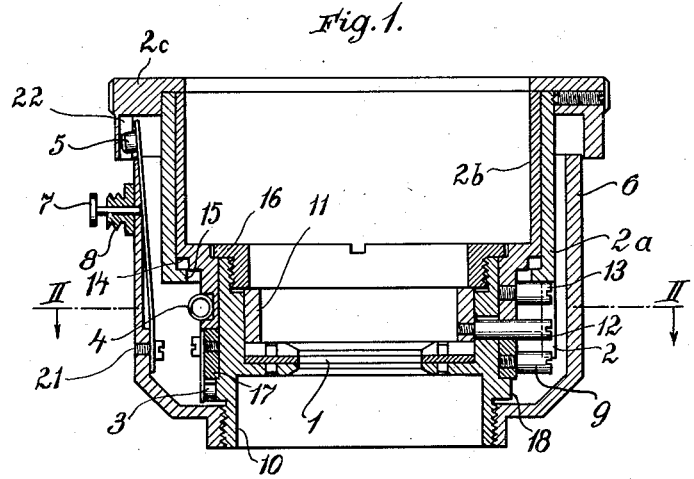
Figure 2:
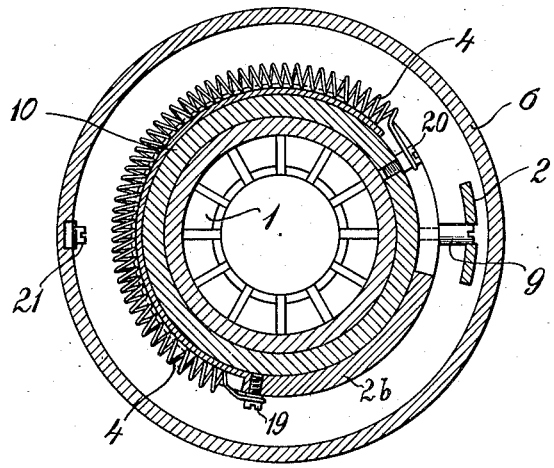

The invention will be described with reference to the accompanying drawing in which:

Fig. 1 is an axial section through the diaphragm adjusting mechanism of a camera according to the invention; and Fig. 2 is a cross section on the line II—II of Fig. 1.

The diaphragm 1 is mounted in its cylindrical housing 10 relative to which the diaphragm ring 11 is rotatable by means of a pin 12 passing through a slot in the housing. The housing 10 is threadedly secured to the stationary cylinder 6. The diaphragm control element comprises an outer sleeve 2a having a forked appendage 2 which straddles the pin 12, an inner sleeve 2b rotatable in unison with outer sleeve 2a by means of a connecting pin 13 engaged by the fork 2, and a milled flange 2c fixed to the outer sleeve 2a. An annular recess 14 on the inner sleeve 2b and a co-operating shoulder 15 on the outer sleeve 2a allow limited axial displacement of the outer sleeve 2a with respect to the inner sleeve 2b, the pin 13 acting as a stop for the forward movement of sleeve 2a.

A retaining ring 16, threadedly engaging the housing 10, holds the diaphragm ring 11 and the inner sleeve 2b in place. An annular member 17, forming a detached forward continuation of the sleeve 2b, is rotatably positioned between the latter and an annular shoulder 18 projecting from housing 10. A pin 9, projecting from the annular member 17, is engageable by the ends of fork 2 when the outer sleeve 2a is in its normal position, as illustrated, thereby coupling the member 17 with the control member 2a, 2b and with the diaphragm ring 11 for simultaneous rotation. Sleeve 2b is axially spaced from member 17 over part of its periphery (right-hand portion of Fig. 1) to provide clearance for the pin 12.

A resilient index finger 3, secured to the annular member 17, is adapted to fall into notches provided in the annular shoulder 18, thereby yieldably retaining the member 17 in a selected one of several angular positions. A tension spring 4, anchored to the sleeve 2b at 19 and to the housing 10 at 20, tends to rotate the former relative to the latter in clockwise direction as viewed in Fig. 2, such rotation being normally prevented by the prongs of fork 2 which straddles the coupling pin 9. A second resilient index finger 5, secured to the stationary cylinder 6 at 21, is adapted to fall into a notch 22, provided on the inner periphery of flange 2c, when this flange has been rotated into a position corresponding to the maximum opening of diaphragm 1. Finger 5 may be disengaged from notch 22 by means of a trip button 7, slidably held in a nipple 8 adapted to have the shutter release (not shown) of the camera connected thereto.

The operation of the arrangement described is as follows:

By manually rotating the flange 2c, upon removal of finger 3 from its notch in shoulder 18 by suitable means (not shown), the user displaces the diaphragm ring 11 and with it the annular member 17 relative to the housing 10 until the index finger 3 falls into a desired notch in the annular shoulder 18. Next, for the purpose of viewing the finder image, the user retracts the outer sleeve 2a by axially displacing the flange 2c, thereby disengaging the fork 2 from the pin 9, and continues rotation of the diaphragm control element 2a, 2b until the finger 5 snaps into notch 22. This tensions the spring 10 which, however, is sufficiently yieldable to prevent disengagement of the finger 3 from the selected notch. After the user has satisfied himself of the correct centering of the objective, he releases the shutter, thus actuating push button 7 and tripping the finger 5 out of engagement with notch 22. Spring 4 is thereby enabled to return the elements 2, 2a, 2b, 2c, 11 and 12 into a position in which the pin 9 re-engages fork 2, by camming aside the first prong thereof and being stopped by the second which for this purpose may be suitably lengthened. It will thus be seen that the diaphragm ring 11 will now re-occupy the position in which it found itself when the index finger 3 snapped into the selected notch, this finger being, of course, sufficiently rigid to prevent its dislodgment from the notch by the impact.

It should be understood that the invention is not limited to the specific embodiment shown and described, and that it may be used to advantage in combination with objectives other than a dual purpose objective of a reflex camera, as, for example, the objective of a camera having a ground glass for the focusing of the image.

What is claimed is:

1. In a camera, in combination, a stationary housing, a control element, an actuating member and a stop member all concentrically mounted on said housing for rotation about a common axis, a diaphragm having an opening variable by rotation of said control element relative to said housing, spring means urging rotation of said control element in a first sense tending to decrease the size of said opening, said actuating member being permanently coupled with said control element and being axially displaceable between a first and a second axial position with respect to said housing, a first formation on said stop member, first abutment means permanently entrained by said actuating member and engageable by said first formation upon rotation of said actuating member in said first sense, thereby preventing rotation of said actuating member and of said control element beyond a predetermined position relative to said stop member upon displacement of the actuating member toward closure of the diaphragm, a second formation on said stop member, second abutment means on said actuating member engageable by said second formation upon rotation of said actuating member in a second sense, opposite said first sense, in said second axial position only but permanently disengaged from said second formation in said first axial position of said actuating member, said actuating member thus rotatively entraining said stop member when rotated in said second axial position toward maximum opening of the diaphragm, first indexing means adapted to hold said stop member in an angular position selected by thus rotating said actuating member, second indexing means adapted to hold said control element in an extreme position, corresponding to maximum diaphragm opening, upon rotation of said actuating member in said second sense, and release means for inactivating said second indexing means, thereby enabling said spring means to remove said actuating member and said control element from said extreme position to another position corresponding to a preselected setting of said stop member.

2. The combination according to claim 1 wherein said actuating member is provided with an axially directed bifurcation, said second abutment means comprising one of the prongs of said bifurcation, at least said second formation being part of a pin projecting from said stop member and engageble by said prongs.

3. The combination according to claim 2, wherein said control element is provided with a projection permanently received between the prongs of said bifurcation, thereby coupling said control element with said actuating member.

KARL HEINZ SCHÜTZ.

REFERENCES CITED

The following references are of record in the file of this patent:

UNITED STATES PATENTS

| Number | Name | Date |
|---|---|---|
| 2,222,298 | Nerwin | Nov. 19, 1940 |
| 2,262,509 | McNabb | Nov. 11, 1941 |
| 2,269,401 | Steiner | Jan. 6, 1942 |
| 2,311,822 | Frankel | Feb. 23, 1943 |

FOREIGN PATENTS

| Number | Country | Date |
|---|---|---|
| 409,777 | Great Britain | May 10, 1934 |